(12) United States Patent
Hwang

(10) Patent No.: US 6,744,963 B2
(45) Date of Patent: Jun. 1, 2004

(54) OPTOELECTRICAL TRANSCEIVER MODULE WITH DE-LATCHING MECHANISM

(75) Inventor: Jenq-Yih Hwang, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/080,001

(22) Filed: Feb. 20, 2002

(65) Prior Publication Data

US 2003/0156801 A1 Aug. 21, 2003

(51) Int. Cl.⁷ .............................. G02B 6/36; G02B 6/00
(52) U.S. Cl. ......................... 385/139; 385/89; 385/92
(58) Field of Search ........................... 385/92, 139, 88, 385/89, 93–94, 81, 62

(56) References Cited

U.S. PATENT DOCUMENTS

| | | | |
|---|---|---|---|
| 5,901,263 A | * | 5/1999 | Gaio et al. ............... 385/92 |
| 5,930,426 A | * | 7/1999 | Harting et al. ........... 385/56 |
| 6,335,869 B1 | * | 1/2002 | Branch et al. ........... 361/816 |
| 6,430,053 B1 | | 8/2002 | Peterson et al. |
| 6,461,058 B1 | * | 10/2002 | Birch et al. ............. 385/92 |
| 2002/0150353 A1 | * | 10/2002 | Chiu et al. .............. 385/88 |
| 2003/0044129 A1 | * | 3/2003 | Ahrens et al. ........... 385/92 |

OTHER PUBLICATIONS

U.S. patent application Ser. No. 10/163,832, Huang.

* cited by examiner

Primary Examiner—David V. Bruce
Assistant Examiner—Thomas R Artman
(74) Attorney, Agent, or Firm—Wei Te Chung

(57) ABSTRACT

An optoelectrical transceiver module is adapted to be retained in a metal cage (6). The optoelectrical transceiver module includes a latch (137) of a housing (1) of an optoelectrical assembly (10), an ejector (17) for disengaging the latch from a retaining tab (611) of the cage, a de-latching mechanism (20), an upper cover (4), and a lower cover (5). The de-latching mechanism includes a driving device (7) and a linking rod (8). The driving device is rotatably attached to the upper cover, and movably engaged with the ejector. Pulling the driving device drives the ejector to slide into the housing, whereupon the latch of the optoelectrical transceiver module is released from the retaining tab of the cage.

19 Claims, 4 Drawing Sheets

OPTOELECTRICAL TRANSCEIVER MODULE WITH DE-LATCHING MECHANISM

BACKGROUND OF THE INVENTION

1. Field of the Invention

The present invention relates to an optoelectrical transceiver module for fiber-optic communications, and in particular to an optoelectrical transceiver module having a de-latching mechanism.

2. Description of the Related Art

Optoelectrical transceiver modules provide bi-directional transmission of data between an electrical interface and an optical data link. The module receives electrically encoded data signals, which are converted into optical signals and transmitted over the optical data link. The module also receives optically encoded data signals, which are converted into electrical signals and transmitted onto the electrical interface.

The optoelectrical module is generally retained in a complementary cage. The cage conventionally comprises spring means located in a rear portion thereof. When the optoelectrical module is withdrawn from the cage, an ejecting block of the optoelectrical module forces a fixed latch of the optoelectrical module out from a retaining hole defined in a spring latch of the cage. The fixed latch is released from the spring latch. The optoelectrical module is then ejected from the cage by the spring means. The optoelectrical module forms a guide rail at a bottom of a front portion thereof. An ejecting block slidably engages in the guide rail at the bottom of the optoelectrical module. In order to withdraw the optoelectrical module from the cage, the ejecting block is manually pushed inwardly under the optoelectrical module. Please refer to the copending application Ser. No. 09/999,446 filed on Dec. 3, 2001 having the same inventor and the same assignee with the application. However, it is inconvenient to manually push the ejecting block at that location. This is particularly so in modern systems having high port densities in and around the cage that restrict access to the ejecting block.

An improved optoelectrical transceiver module which provides for convenient withdrawal of the module from a complementary cage is desired.

SUMMARY OF THE INVENTION

Therefore, an object of the present invention is to provide an optoelectrical module having a release device which is readily operated in front of the optoelectrical module.

Another object of the present invention is to provide a de-latching mechanism for easily operating the abovementioned release device.

In order to achieve the objects set out above, an optoelectrical transceiver module in accordance with a preferred embodiment of the present invention is adapted to be retained in a metal cage. The optoelectrical transceiver module comprises a latch of a housing of an optoelectrical assembly, an ejector for disengaging the latch from a retaining tab of the cage, a de-latching mechanism, an upper cover, and a lower cover. The de-latching mechanism comprises a driving device and a linking rod. The driving device is rotatably attached to the upper cover, and movably engaged with the ejector. Pulling the driving device drives the ejector to slide into the housing, whereupon the latch of the optoelectrical transceiver module is released from the retaining tab of the cage.

Other objects, advantages and novel features of the present invention will be drawn from the following detailed description of a preferred embodiment of the present invention with attached drawings, in which:

DETAILED DESCRIPTION OF THE INVENTION

Figure 1:
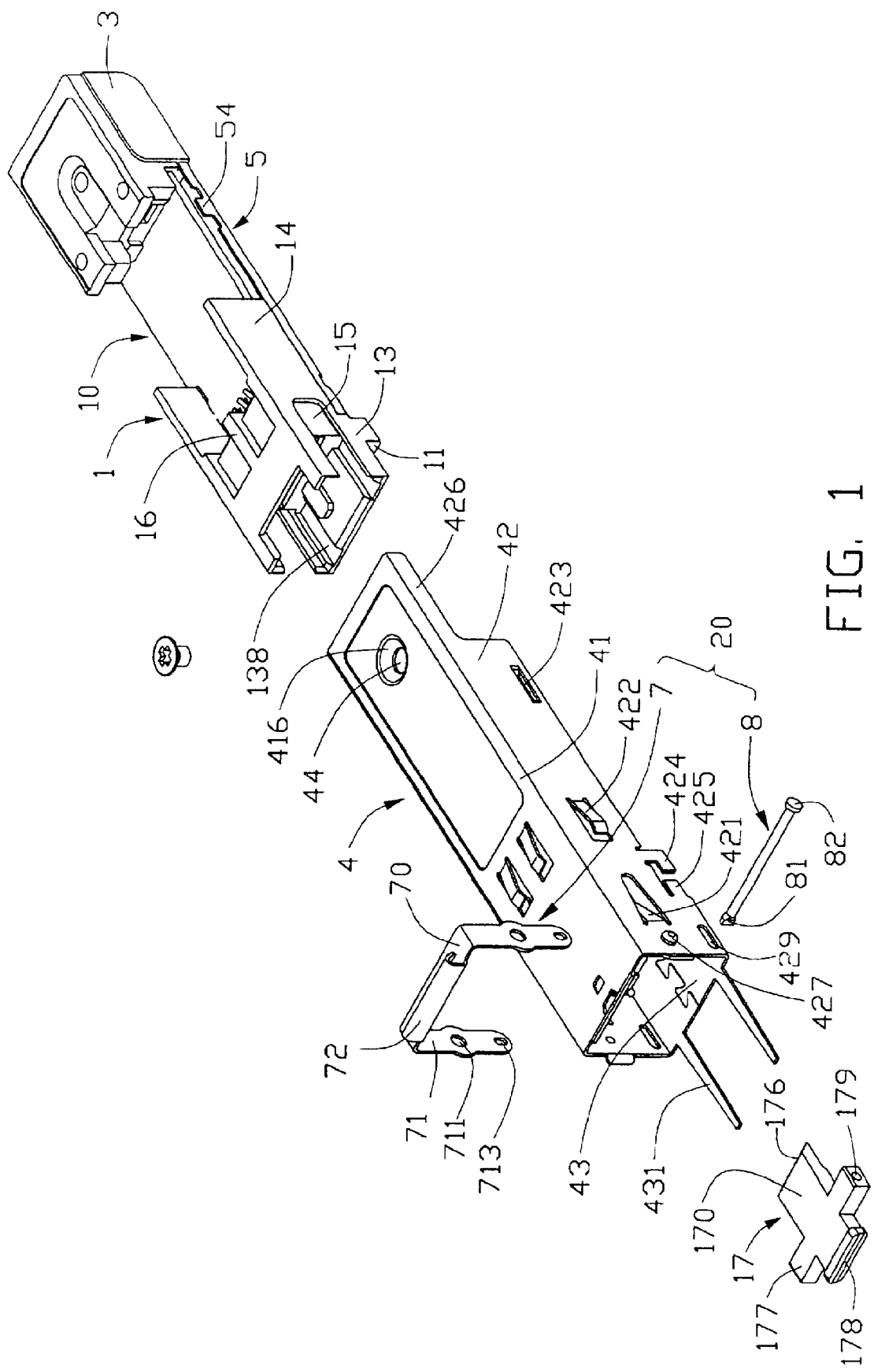
FIG. 1 is an exploded perspective view of an optoelectrical transceiver module in accordance with the present invention, viewed from a top aspect.

Referring to FIG. 1, an optoelectrical transceiver module in accordance with a preferred embodiment of the present invention comprises an optoelectrical assembly 10, an upper cover 4, a lower cover 5, an ejector 17 and a de-latching mechanism 20. The upper cover 4 retains the optoelectrical assembly 10 therein. The ejector 17 is received in the optoelectrical assembly 10. The de-latching mechanism 20 is movably attached to the upper cover 4, and movably engaged with the ejector 17.

Figure 2:
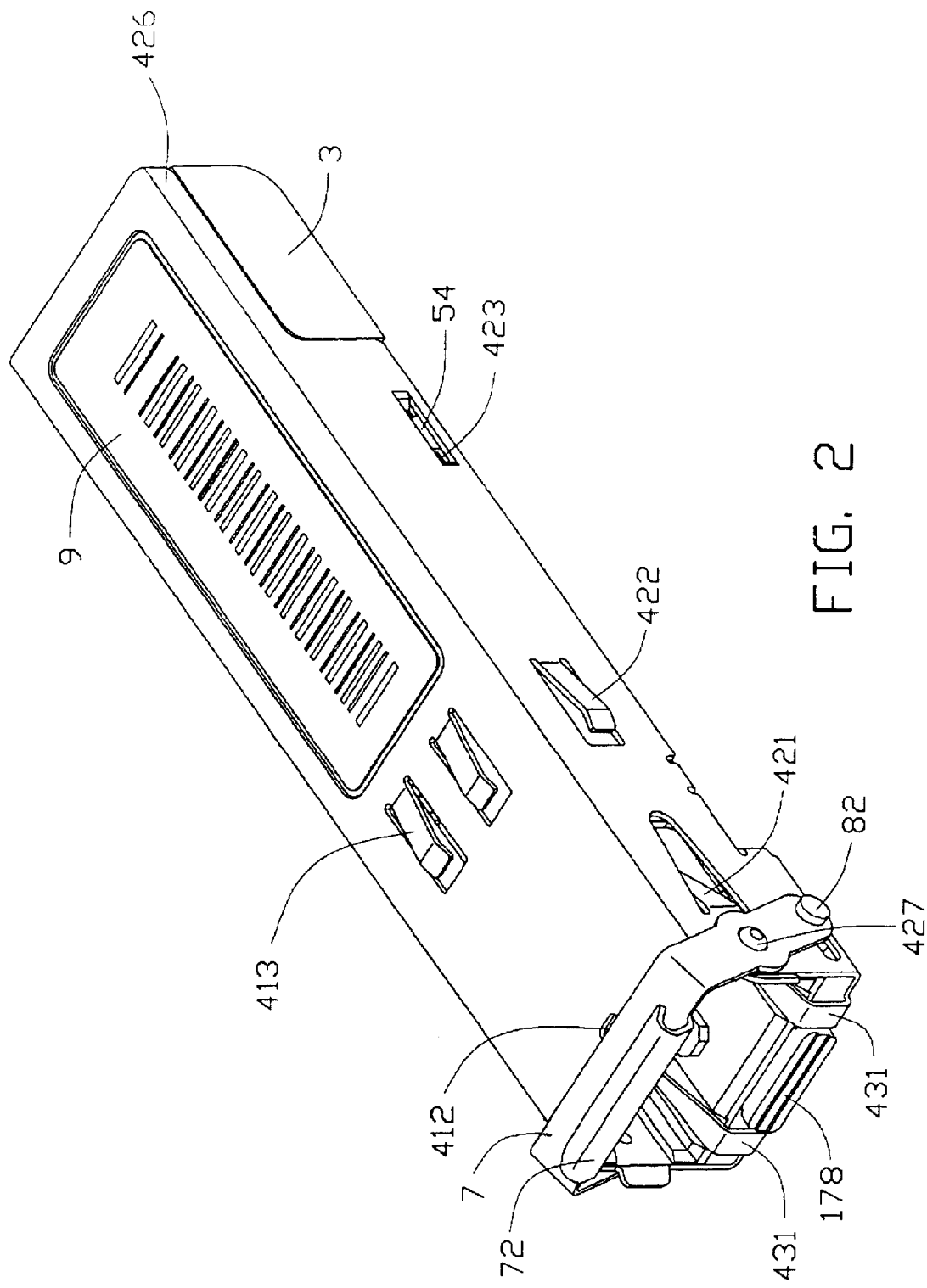
FIG. 2 is an assembled view of FIG. 1.
Figure 3:
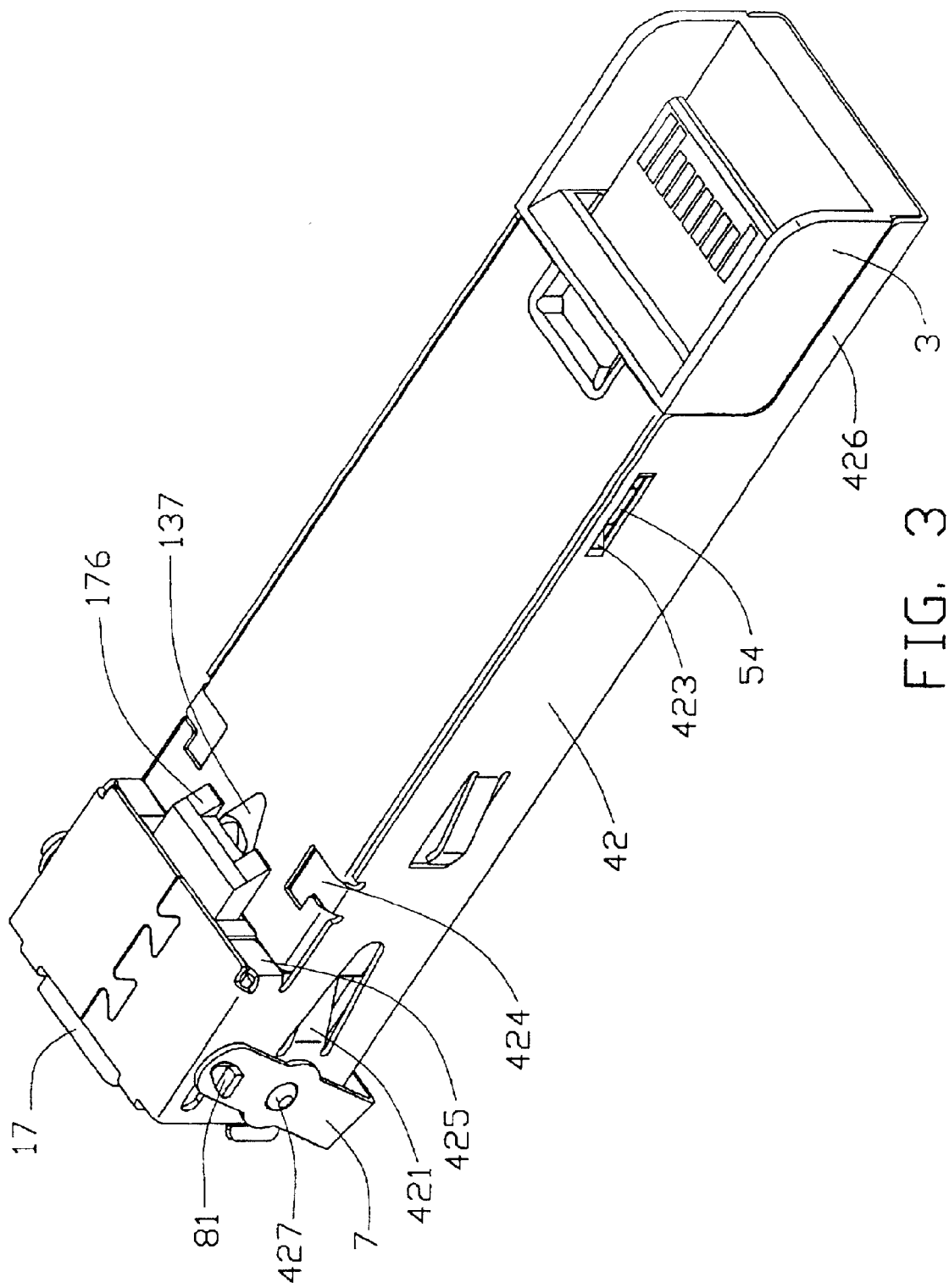
FIG. 3 is also an assembled view of FIG. 1, but viewed from a bottom aspect.

Referring also to FIGS. 2 and 3, the optoelectrical assembly 10 comprises a housing 1 which is generally made of plastic material. The housing 1 comprises a front end 11, a lower portion 13, two parallel and opposite sidewalls 14 extending generally upwardly from the lower portion 13, a bracket 15, and an upper portion 16. The lower portion 13, the sidewalls 14 and the upper portion 16 integrally enclose the bracket 15. A front section of the lower portion 13 forms an ejector seat (not shown) to receive the ejector 17. A triangular latch 137 is integrally formed on a middle portion of a bottom surface of the lower portion 13. A bottom surface of the triangular latch 137 slants upwardly toward the bottom surface of the lower portion 13, from a front end of the triangular latch 137 to a rear end of the triangular latch 137. Two spaced and parallel recesses 138 are defined in an inner face of the lower portion 13 of the housing 1.

The upper cover 4 is generally made of metal. The upper cover 4 comprises an upper plate 41, two sidewalls 42 integrally depending from the upper plate 41, and a bottom plate 43 formed between front portions of the sidewalls 42. Each sidewall 42 has a slender rear portion 426. A distance between the sidewalls 42 is substantially equal to a distance across a narrowed top portion of the base 3 (best seen in FIG. 3). A bent tab 421 extends inwardly from the front portion of each sidewall 42. An outwardly protruding grounding finger 422 is formed in a middle portion of each sidewall 42. A lower rear portion of each sidewall 42 forms an internal reception socket 423. A stamped pivot head 427 is outwardly formed on the front portion of each side wall 42, between the bent tab 421 and a front edge of the side wall 42. A horizontal second guide slot 429 is defined in the front portion of each side wall 42, below the pivot head 427. A countersunk portion 416 is formed in a middle of a rear portion of the upper plate 41. A countersunk hole 44 is defined in a middle of the countersunk portion 416, for extension of a screw (not labeled) therethrough. A stop 412 is inwardly stamped from a middle of a front portion of the upper plate 41. Two outwardly protruding grounding fingers 413 are formed in a middle portion of the upper plate 41.

Two spaced elongate locking tabs 431 integrally extend forwardly from a front edge of the bottom plate 43. Two elbow-shaped locking tabs 424 integrally depend from respective opposite bottom edges of the sidewalls 42 near the bottom plate 43. Two rectangular tabs 425 integrally extend rearwardly from the front portions of the sidewalls 42 respectively, at the bottom plate 43. A label 9 showing information about the optoelectrical module is for adhering to the upper plate 41.

The lower cover 5 comprises a pair of positioning tabs 54 (only one visible) extending upwardly from respective opposite sides of a rear portion thereof.

The ejector 17 comprises a main body 170, and a push bar 178 at a front end of the main body 170. A pair of slanted ejecting protrusions 176 is formed at rear end of the main body 170. The main body 170 comprises a transverse guide beam 177 integrally formed rearwardly of the push bar 178. Opposite ends of the guide beam 177 protrude from opposite sides respectively of the main body 170. A through hole 179 is longitudinally defined through the guide beam 177.

The de-latching mechanism 20 comprises a U-shaped driving device 7 and a linking rod 8. The driving device 7 comprises a top beam 70, and a pair of latch arms 71 depending from opposite ends of the top beam 70 respectively. A handle portion 72 extends upwardly from a front edge of the top beam 70. A pair of pivot holes 711 is respectively defined in middle portions of the latch arms 71. A pair of first guide slots 713 is longitudinally defined near free ends of the latch arms 71 respectively. A straight stop 81 and a round stop 82 are formed at respective opposite ends of the linking rod 8.

In assembly, the optoelectrical assembly 10 is inserted into the upper cover 4. The stop 412 of the upper cover 4 prevents over-insertion of the optoelectrical assembly 10 into the upper cover 4. The lower cover 5 is then attached to the combined optoelectrical assembly 10 and upper cover 4. The positioning tabs 54 of the lower cover 5 are engagingly received in the reception sockets 423 of the upper cover 4. The ejector 17 is then snapped into the ejector seat (not shown) of the housing 1 of the optoelectrical assembly 10. The guide beam 177 of the ejector 17 abuts against the front end 11 of the housing 1. A top face of the front portion of the lower cover 5 is firmly held by the ejecting protrusions 176 of the ejector 17 (see FIG. 3). The push bar 178 is fully exposed forward of the upper cover 4. The locking tabs 431 of the upper cover 4 are bent rearwardly and inwardly, and are respectively engaged in the recesses 138 of the lower portion 13 of the housing 1. The locking tabs 431 and the stop 412 of the upper cover 4 prevent over-extension of the optoelectrical assembly 10 into the upper cover 4. The elbow-shaped tabs 424 of the upper cover 4 are bent inwardly and upwardly, and are engagingly received in the housing 1. The rectangular tabs 425 of the upper cover 4 are bent inwardly to fixedly retain the housing 1. The screw (not labeled) is extended through the countersunk hole 44 of the upper cover 4 to threadedly engage in the base 3. The upper and lower covers 4, 5 are thereby firmly attached to the optoelectrical assembly 10.

Referring particularly to FIG. 2, the driving device 7 is attached to the upper cover 4. The stamped pivot heads 427 of the upper cover 4 are rotatably engaged in the pivot holes 711 of the driving device 7. The straight stop 81 of the linking rod 8 is inserted through one first guide slot 713 of the driving device 7, one second guide slot 429 of the upper cover 4, the through hole 179 of the ejector 17, the other second guide slot 429, and the other first guide slot 713. The straight stop 81 and the round stop 82 of the linking rod 8 respectively protrude from the sidewalls 42 of the upper cover 4. Finally, the straight stop 81 is deformed to rotatably fasten the linking rod 8 in position. The label 9 is adhered onto the upper plate 41. Assembly of the optoelectrical module is thus completed.

Figure 4:
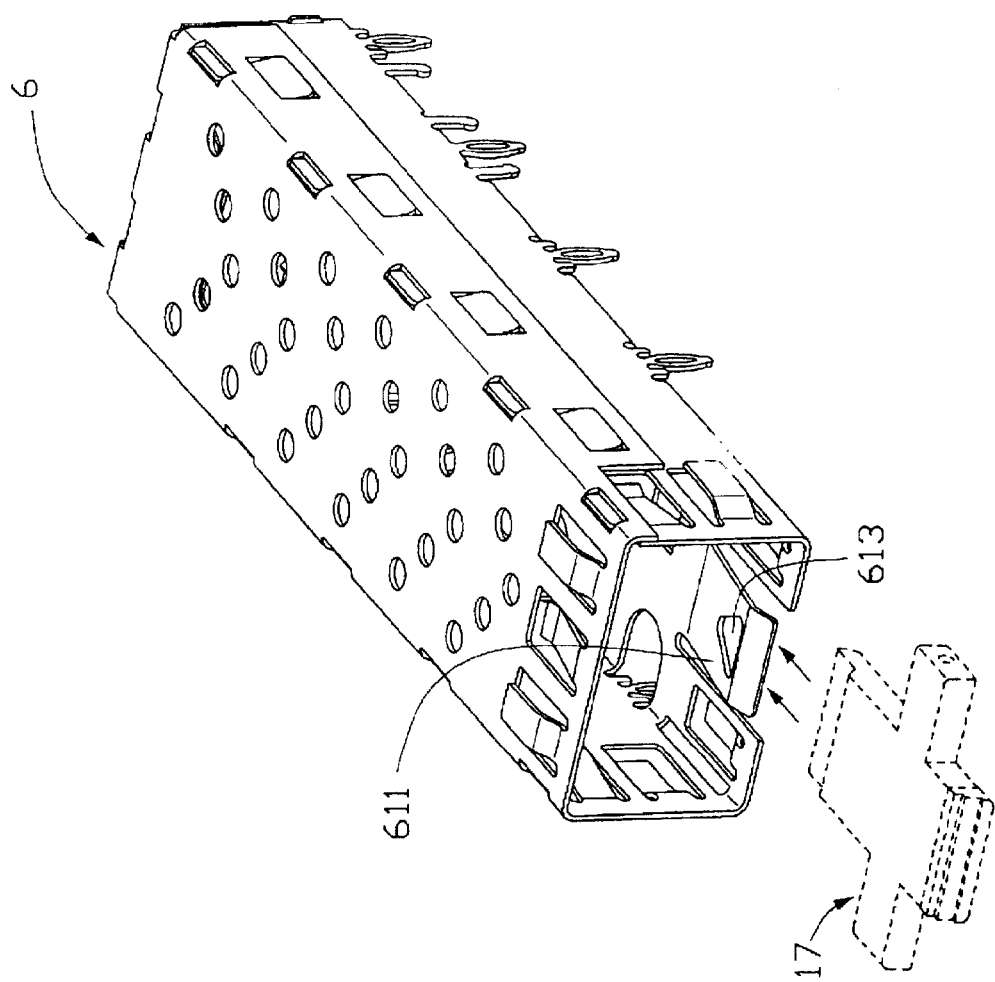
FIG. 4 is a perspective view of a metal cage, and an ejector of the module of FIG. 1 shown with broken lines.

FIG. 4 schematically illustrates a process of releasing the optoelectrical module from engagement inside a complementary cage 6. The cage 6 has an inwardly protruding retaining tab 611 formed at a front part of a bottom plate thereof. The retaining tab 611 has a triangular hole 613 defined therein, and the triangular hole 613 engagingly retains the triangular latch 137 of the optoelectrical module therein. The handle portion 72 of the driving device 7 is pulled forwardly away from the front of the optoelectrical module. Accordingly, the driving device 7 pulls the ejector 70 into the ejector seat (not shown) of the housing 1. The ejecting protrusions 174 of the ejector 17 enter a space (not labeled) between the bent portion 611 and a bottom of the optoelectrical module. The ejecting protrusions 174 slidingly contact the retaining tab 611, and progressively force the retaining tab 611 away from the optoelectrical module. As a result, the retaining tab 611 is released from the triangular latch 137. The optoelectrical module is then ejected from the cage 6 by conventional spring means (not shown) located in a rear portion of the cage 6.

It should be understood that various changes and modifications to the presently preferred embodiment described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. An optoelectrical transceiver module comprising:
   an optoelectrical assembly;
   a cover retaining the optoelectrical assembly therein;
   an ejector slidably received in the cover; and
   a driving device rotatably attached to the cover and movably engaged with the ejector; wherein
   the cover comprises a pair of pivot heads, and the driving device defines a pair of pivot holes rotatably receiving the pivot heads of the cover therein.

2. The optoelectrical transceiver module as described in claim 1, wherein the ejector comprises a main body having at least one slanted protrusion at an end thereof.

3. The optoelectrical transceiver module as described in claim 1, wherein a pair of guide slots is defined in the cover corresponding to a pair of guide slots defined in the driving device.

4. The optoelectrical transceiver module as described in claim 3, wherein the main body of the ejector comprises a transverse guide beam, a through hole is defined in the guide beam, and the driving device comprises a linking rod movably engaged in the guide slots of the driving device, the guide slots of the cover and the through hole of the ejector.

5. An optoelectrical transceiver module adapted to be retained in a cage having a retaining tab at a bottom thereof, the optoelectrical transceiver module comprising:
   a housing comprising a latch for engaging with the retaining tab of the cage;
   an ejector for disengaging the latch from the retaining tab of the cage, the ejector comprising a main body, a through hole being defined in the main body;
   a cover retaining the housing and the ejector; and a de-latching mechanism comprising a driving device and a linking rod, the driving device rotatably attached to the cover, the linking rod rotatably connected to the driving device and rotatably received in the through hole of the ejector.

6. The optoelectrical transceiver module as described in claim 5, wherein the cover comprises a pair of pivot heads, and the driving device defines a pair of pivot holes rotatably receiving the pivot heads of the cover therein.

7. The optoelectrical transceiver module as described in claim 5, wherein a pair of guide slots is defined in the cover corresponding to a pair of guide slots defined in the driving device.

8. The optoelectrical transceiver module as described in claim 7, wherein the main body of the ejector comprises a transverse guide beam, the through hole of the ejector is defined through the guide beam, and the linking rod is movably received in the guide slots of the driving device and the guide slots of the cover.

9. The optoelectrical transceiver module as described in claim 5, wherein the main body of the ejector has at least one slanted protrusion at an end thereof.

10. An optoelectrical module comprising;

an insulative housing;

optoelectrical components disposed in the housing;

a cover enclosing the housing, defining elongated guide slots through opposite sidewalls thereof;

a latch located outside the cover and protruding outwardly in a vertical direction;

an ejector moveable relative to the housing in a horizontal direction; and a driving device actuating said ejector to move; and a separate linking member connecting said device with said cover; wherein said driving device is moved in a non-linear manner relative to the housing when said linking member is moved back and forth in said elongated slots.

11. The module as described in claim 10, wherein said driving device is mounted to one of said cover and said housing.

12. The module as described in claim 10, wherein said driving device is pivotal with regard to the housing.

13. A method of releasing a module from a cage, comprising the steps of:

providing the module with a latch protruding in a vertical direction;

providing a releasing mechanism around said latch;

providing the cage with a resilient retaining tab;

inserting said module into the cage and having the latch locked by said retaining tab wherein said releasing mechanism is accessibly operable from an exterior via a driving device; and pulling said driving device forward along a substantially, horizontal direction to actuate said releasing mechanism to deflect said retaining tab in said vertical direction for unlatching said latch from said retaining tab.

14. The method as described in claim 13, wherein when said driving device is pulled forward horizontally, said retaining tab is pressed downwardly by an ejector such that said latch is disengaged from said retaining tab.

15. The method as described in claim 14, wherein said releasing mechanism is mounted to the module.

16. The method as described in claim 15, wherein said driving device is movably engaged with said ejector, and said ejector is moved rearwardly in a horizontal direction when said driving device is pulled forwardly along a substantially horizontal direction.

17. The method as described in claim 16, wherein said driving device is engaged with said ejector by a linking rod.

18. The method as described in claim 13, wherein said driving device is mounted to the module.

19. The method as described in claim 13, wherein said driving device and said releasing mechanism are discrete m each other.

* * * * *